(12) United States Patent
Guerret et al.

(10) Patent No.: US 8,038,843 B2
(45) Date of Patent: Oct. 18, 2011

(54) USE OF A MINERAL-MATERIAL STERIC DISPERSING AGENT IN WATER, AQUEOUS DISPERSION THUS OBTAINED AND USE THEREOF IN PAPER MAKING

(75) Inventors: Olivier Guerret, La Tour de Salvagny (FR); Francois Dupont, Lyons (FR); Jacques Mongoin, Quincieux (FR)

(73) Assignee: Coatex S.A.S., Genay (FR)

( * ) Notice: Subject to any disclaimer, the term of this patent is extended or adjusted under 35 U.S.C. 154(b) by 118 days.

(21) Appl. No.: 12/446,244

(22) PCT Filed: Oct. 10, 2007

(86) PCT No.: PCT/IB2007/003123
§ 371 (c)(1),
(2), (4) Date: Apr. 20, 2009

(87) PCT Pub. No.: WO2008/047220
PCT Pub. Date: Apr. 24, 2008

(65) Prior Publication Data
US 2010/0314061 A1    Dec. 16, 2010

(30) Foreign Application Priority Data
Oct. 19, 2006  (FR) .................................. 06 09166

(51) Int. Cl.
*D21F 11/00*    (2006.01)
(52) U.S. Cl. ...................................... 162/152

(58) Field of Classification Search .................. 162/152, 162/164.6, 164.7, 168.1; 524/556, 507, 413
See application file for complete search history.

(56) References Cited

U.S. PATENT DOCUMENTS

| 6,057,398 A | 5/2000 | Blum |
| 2004/0019148 A1 | 1/2004 | Suau et al. |

FOREIGN PATENT DOCUMENTS

| EP | 0 892 111 | 1/1999 |
| FR | 2 810 261 | 12/2001 |

OTHER PUBLICATIONS

U.S. Appl. No. 12/444,591, filed Apr. 7, 2009, Mongoin, et al.

*Primary Examiner* — Mark Halpern
(74) *Attorney, Agent, or Firm* — Oblon, Spivak, McClelland, Maier & Neustadt, L.L.P.

(57) ABSTRACT

A method for manufacturing a sheet of paper from a pulp and a sheet of paper obtained by the present method, wherein said pulp comprises a mixture of natural and/or synthetic fibers, water, and at least one aqueous suspension and/or dispersion comprising at least one mineral material, wherein said dispersion or suspension comprises, as a steric dispersing agent of at least one mineral material, at least one copolymer comprising at least one vinylic monomer, at least one non-ionic monomer, or a mixture of several monomers having formula (I) in the present method, wherein said agent limits the presence of divalent ions in the aqueous phase and said agent is not a chelating agent.

19 Claims, 1 Drawing Sheet

USE OF A MINERAL-MATERIAL STERIC DISPERSING AGENT IN WATER, AQUEOUS DISPERSION THUS OBTAINED AND USE THEREOF IN PAPER MAKING

This application is a 371 of PCT/IB2007/003123 filed on 10 Oct. 2007

FIELD OF THE INVENTION

The present invention concerns the technical field of methods for manufacturing a sheet of paper, using a mineral material in an aqueous suspension and/or dispersion, particularly including calcium carbonate, said mineral material being stabilized by means of a steric dispersing agent.

BACKGROUND OF THE INVENTION

In connection with the manufacture of a sheet of paper, a first stage consists in converting the paper pulp, by means of the paper machine, into a sheet of paper, which is not yet coated. The paper pulp essentially contains natural or synthetic fibers, water, and one or more mineral fillers such as calcium carbonate, together with various other additives, said mineral filler being mixed with the fibers in the form of an aqueous suspension and/or dispersion. It is then said that a mineral filler (such as calcium carbonate) is used as a mass filler. The sheet thereby obtained can then possibly be coated during a second operation which consists of depositing on the surface of the support paper an aqueous compound called a "paper coating", which notably contains water, one or more mineral fillers (such as calcium carbonate), one or more binders, and various additives.

Calcium carbonate, of natural or synthetic origin, is commonly used as a mass filler, making it possible to improve the optical properties of the sheet of paper, particularly including its gloss. This calcium carbonate is generally implemented in the form of an aqueous suspension and/or dispersion, wherein the mineral material is stabilized in water by means of dispersing agents.

In the particular case of sheets of paper known as "supercalendered" papers which undergo a very high compression in the calendering operation with a view to providing a very smooth sheet, intended notably for offset and rotogravure printing, it is well known that the gloss of the final product deteriorates as the pH of the medium containing the pulp and the mineral material increases. Attempts have thus been made to manufacture such papers in an acidic environment, through the introduction, just before manufacturing the sheet of paper, of carbon dioxide or a weak acid particularly including phosphoric acid, with a view to reducing the pH of the medium containing the pulp and the mineral material, and to maintaining it at a value of under 7.

However, it is well known that calcium carbonate, used in an acidic medium, becomes partially soluble, leading to the presence of calcium ions in the aqueous phase. This solubilization poses the double problem of:

reducing the quantity of calcium carbonate which the formulator seeks to introduce in the final stage in the sheet of paper, since this carbonate is partly solubilized,
and of increasing the concentration of calcium ions in the aqueous phase of the medium containing the pulp and the calcium carbonate, and thus of increasing the pH of the medium, which harms the final optical properties of the paper, such as its gloss.

There is thus a real technical need for a solution enabling calcium carbonate to be used in a method for manufacturing paper in an acidic medium, to compensate for the disadvantages outlined above.

This solution was engineered using the technology known as "Weak Acid/Chelatant" (or "WAC"), which was described in the document "Neutral ground wood papers: practical and chemical aspects" (International Paper and Coatings Chemistry Symposium, 5th, Montreal, QC, Canada, Jun. 16-19, 2003, Publisher: Pulp and Paper Technical Association of Canada, Montreal, Quebec). It is based on the use of a weak acid in combination with a chelating agent of calcium. Calcium carbonates manufactured in this manner were then qualified as "acid-stabilized" or "acid-resistant" calcium carbonates. The action mechanism of the "weak acid/chelating" technology, as proposed in this document, is as follows. Initially, the reaction between the calcium carbonate and the weak acid gives rise to chemical species which play a role as a pH buffer, in relation to the medium in which the calcium carbonate is used. For example, when phosphoric acid is used as a weak acid, soluble species are created in the presence of calcium carbonate, namely calcium hydrogeno- and dihydrogenophosphate. These species make it possible to buffer the aqueous medium in which said carbonate is used. A chelating agent is then introduced into the medium, the role of which is to stabilize the previously created buffer system, notably through the mechanism of sequestering the ions in the solution. The Applicant indicates that the expression "chelating agent" refers to a compound having the ability to bind itself to a positive ion with which it forms a compound (or chelate), in which the central atom is bound to the neighboring atoms by at least two links, forming a ring structure (see on this subject the definition given by Kirk-Othmer Encyclopedia of Chemical Technology, Vol. 5, pp 339-68).

Thus, document U.S. Pat. No. 5,043,017 describes an "acid-stabilized" calcium carbonate, by combining a chelating agent of calcium (or a combined base) with a weak acid, the carbonate thereby obtained being in chemical balance with the chelating agent or combined base, and also with the weak acid. The chelating agent is very preferentially sodium hexametaphosphate, while the weak acid is chosen from among the phosphoric, hexametaphosphoric, citric, boric, sulfurous, and acetic acids, or mixtures thereof. A calcium carbonate is thereby obtained which can be used in the manufacture of paper in an acidic medium, giving said paper improved optical properties in terms of its light scattering coefficient, opacity and gloss.

In relation with the previous document, document U.S. Pat. No. 5,156,719 describes a method to increase the optical properties of a paper (said paper being manufactured notably in an acidic medium), such as its gloss, through the use of "acid-stabilized" calcium carbonate, as described in document U.S. Pat. No. 5,043,017.

As for document WO 98/29601, it describes an aqueous suspension of "acid-stabilized" calcium carbonate comprising water, calcium carbonate, and a stabilizing acid found in a sufficient quantity to achieve a pH less than 7. Said stabilizing acid is chosen from among a water-soluble salt of calcium, a weak acid, a chelating agent, and the mixture of a water-soluble salt of calcium with a weak acid or a chelating agent. Said chelating agent is notably chosen from among the polycarboxylic, acrylic, phosphonic or sulfonic acids. A calcium carbonate is thereby obtained which breaks down weakly when the pH is below 7, and which allows the manufacture, in an acidic medium, of a paper with improved gloss.

The presence of a chelating agent of calcium has even been extended to the manufacture of paper in a neutral medium, as indicated in document WO 97/41302. The goal of this document is to limit not only the presence of calcium ions in the papermaking method, but also, more generally, the presence of divalent ions: as instructed by this document, these divalent ions may be derived from the breakdown of calcium carbonate, but also through the presence of certain chemical compounds in the method for manufacturing a sheet of paper, such as aluminum sulfate or polyaluminum chloride. In the method for manufacturing a sheet of paper, these divalent ions may chelate the gluing agents such as rosine, which reduces the effectiveness of the said gluing agents: a reduction of the phenomenon of retention of mineral fillers within the fibers is then observed. With a view to limiting the presence of divalent ions in the method for manufacturing a sheet of paper, document WO 97/41302 proposes a solution which lies in the use of a chelating agent or precipitating agent of these divalent ions, where said agent is a phosphated compound.

However, it now appears that these solutions based on the use of chelating agents of divalent ions, and notably the calcium ion, have a serious disadvantage for the person skilled in the art. Indeed, due to their chelating effect, these agents give rise to complexes of ions present in the aqueous phase, particularly including soluble calcium complexes. When such complexes form, an excessive concentration of these species in an aqueous phase will lead to the precipitation of insoluble species.

However, the formation of insolubles in water used in the method for manufacturing a sheet of paper is particularly undesirable, because it leads to the formation of deposits which can clog sieves, filters, pumps, pipes, or boilers or refrigerators, and such a phenomenon can even lead to the total blockage of the papermaking machine. These problems are related in "Deposition and scaling in the pulp & paper industry" (Congresso e Exposicao Anual de Celulose e Papel, 35th, Sao Paulo, Brazil, Oct. 14-17, 2002 (2002) 516-534 Publisher: Associacao Brasileira Tecnica de Celulose e Papel, Sao Paulo, Brazil) and "Treatment of waste water from a cellulose and paper factory by ozone and activated sludge" (Vom Wasser (1976), 46, 221-39), which note the disadvantages relating to the deposition of calcium oxalate-based insoluble species in papermaking installations, or in the document "Calcium oxalate in bleach plant filtrates" (Minimum Effluent Mills Symposium, San Francisco, Oct. 23-24, 1997 (1997), 51-62 Publisher: TAPPI Press, Atlanta, Ga.) which generalizes the problem of deposits of insoluble chemical species in the papermaking process in the presence of calcium and barium ion complexes.

At this stage of the account, the Applicant wishes to emphasize that, although the state of the technique clearly demonstrates that the problems relating to the presence of calcium oxalate-based insoluble species are well-known to the papermaking industry, there is no document demonstrating that these disadvantages may be related to the use of calcium-chelating agents as used according to the "weak acid/chelating" technology. The identification of this new technical problem is thus in itself one of the merits of which the Applicant has shown evidence.

SUMMARY OF THE INVENTION

Continuing her research with a view to using a calcium carbonate:
- in a method for manufacturing paper, notably in an acidic medium,
- while dispersing said calcium carbonate within the aqueous medium in which it is used,
- without using chelating agents, notably chelating agents of divalent ions such as calcium, which leads to the formation of insoluble and undesirable species in the method for manufacturing the sheet of paper.

the Applicant has developed the use, as a steric dispersing agent of at least one mineral material in water, of a copolymer made up:
a) of at least one vinylic monomer,
b) and of at least one non-ionic monomer, whose formula (I) is:

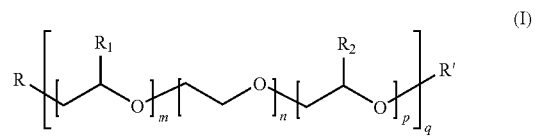

where:
  m and p represent a number of alkylene oxide units less than or equal to 150,
  n represents a number of ethylene oxide units less than or equal to 150,
  q represents an integer at least equal to 1 and such that $5 \leq (m+n+p)q \leq 150$, and preferentially such that $15 \leq (m+n+p)q \leq 120$,
  $R_1$ represents hydrogen or the methyl or ethyl radical,
  $R_2$ represents hydrogen or the methyl or ethyl radical,
  R represents a radical containing an unsaturated polymerizable function, preferentially belonging to the group of vinylics, or to the group of acrylic, methacrylic, maleic, itaconic, crotonic, vinylphthalic esters, or to the group of unsaturated urethanes such as acrylurethane, methacrylurethane, α-α' dimethyl-isopropenyl-benzylurethane, allylurethane, or to the group of allylic or vinylic ethers, whether or not substituted, or to the group of ethylenically unsaturated amides or imides, or to the group constituted by acrylamide and methacrylamide,
  R' represents hydrogen or a hydrocarbonated radical having 1 to 40 carbon atoms, preferentially 1 to 12 carbon atoms, and very preferentially 1 to 4 carbon atoms, and where R' is extremely preferentially the methyl radical,
or a mixtures of several monomers that have formula (I).

DETAILED DESCRIPTION OF THE INVENTION

Figure 1:
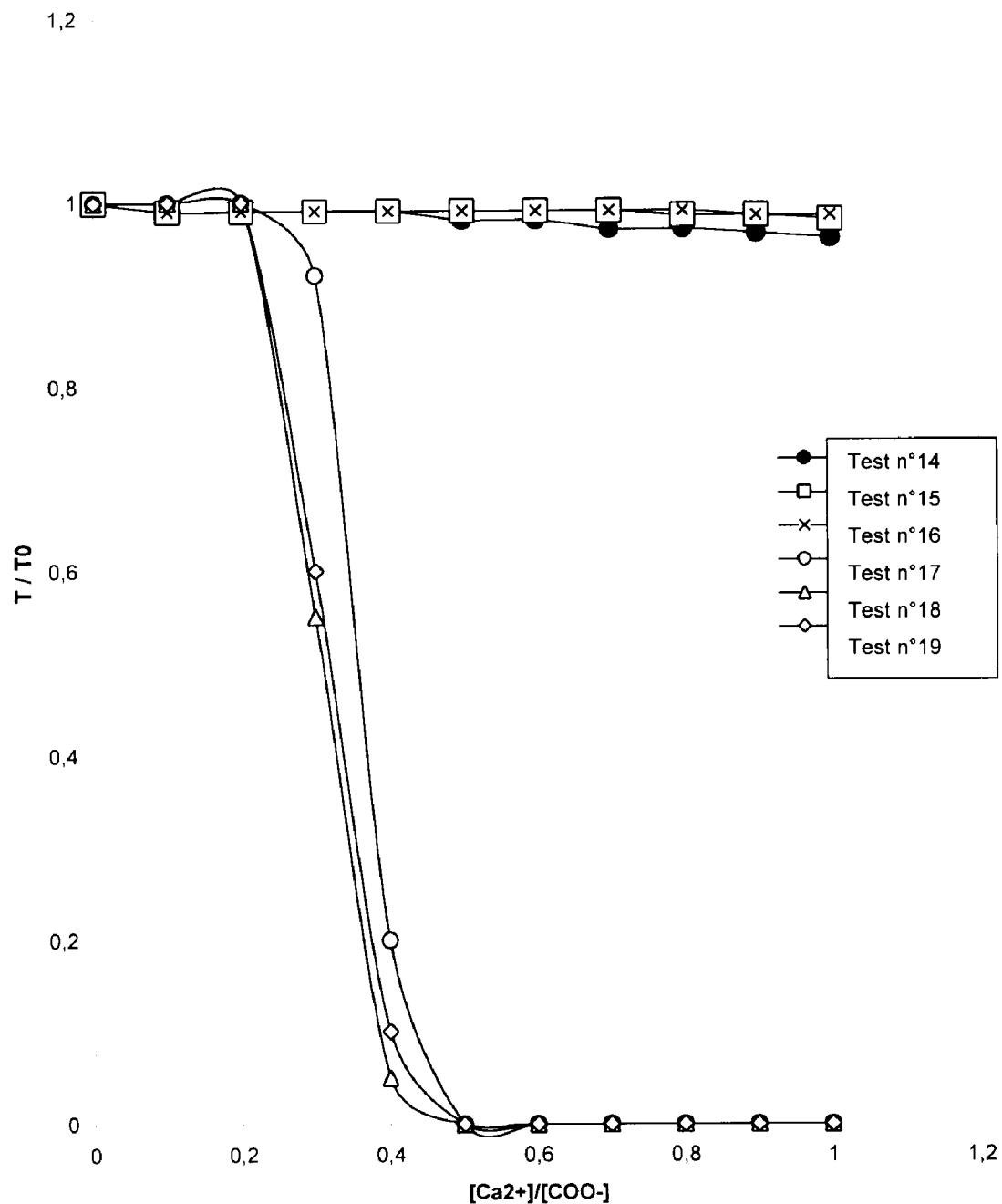
FIG. 1/1 graphically depicts the results of test numbers 14-19 in the present application.

The aqueous suspensions and dispersions of mineral materials thereby obtained may then be used in a method for manufacturing sheets of paper, making it possible to avoid the previously listed disadvantages of the prior art. Just as with the use of said copolymer as a steric dispersing agent of mineral material, the aqueous suspensions and dispersions obtained, the method for manufacturing a sheet of paper from these dispersions and from these suspensions, and lastly the sheet of paper obtained, also form part of the present invention. Said copolymer acting as a steric dispersing agent of mineral material represents the technical link between these different objects that constitute the present invention.

Without wishing to be bound by any theory, the Applicant believes that, notably in the case of calcium carbonate, said copolymer allows the particles of mineral material in an aqueous medium to be stabilized not due to ionic and chelating mechanisms such as those used with the polyacrylic dispersing agents of the prior art, but by phenomena:
- of adsorption of said copolymer on the particles of calcium carbonate, which allows said copolymer to fasten onto said particles,
- and of steric repulsion induced by the presence of the non-ionic monomer that has formula (I), which shields the surface of the particles of calcium carbonate, and thus to a stabilization of all these particles in an aqueous suspension.

This is called a steric dispersing agent, in the sense in which such a dispersing agent is notably defined in section I of the document "Fluidification de suspensions concentrées simples et mixtes par adsorption de polymères: application aux dispersions aqueuses de poudres d'alumine et/ou de rutile par le polyacrylate de sodium et des copolymères dérivés" (Doctoral Thesis of Myriam Gourmand, Université Paris VI [Paris VI University], 1998).

In a particularly advantageous manner, this stabilization mechanism is independent of the pH and ionic strength of the aqueous medium in which the calcium carbonate and these copolymers are used. These copolymers are not ion-chelating agents, and particularly divalent ion-chelating agents, and particularly calcium-chelating agents: they do not lead to the formation of calcium complexes in an aqueous medium. They stabilize the calcium carbonate in an aqueous medium by steric congestion mechanisms, thereby shielding the surface of the calcium carbonate, which reduces its solubility and thus which limits the presence of calcium ions in the aqueous phase.

Consequently, such a solution makes it possible to avoid the use of the technology known as "weak acid/chelating", and compensates for the disadvantages relating to the use of chelating agents which lead to the formation of insoluble and undesirable species in the method for manufacturing a sheet of paper, particularly including the calcium oxalates.

One of the Applicant's merits therefore lies in the fact that she has been able to identify a new technical problem, which is based on the formation of insoluble species in the manufacturing of paper (such as calcium oxalates) through the use of chelating agents by way of the technology known as "weak acid/chelating" (these insoluble species can lead to the complete blockage of a paper manufacturing unit).

Another one of her merits lies in the fact that she has been able to identify an original method of stabilizing calcium carbonate, not relating to ionic and chelating mechanisms such as those implemented through the use of the polyacrylates of the prior art, but rather based on steric repulsion mechanisms. Such a mechanism makes it possible to disperse the calcium carbonate in the aqueous medium in a stable fashion, independently of the pH and of the ionic strength of the medium, limiting the presence of calcium ions in the aqueous phase, without using the chelating agents of the prior art.

Another one of her merits lies in the fact that she has been able to develop a particular dispersing agent of calcium carbonate, the ability of which to disperse said carbonate relies, precisely, on this steric repulsion mechanism. This dispersing agent is not a chelating agent of calcium, in the sense that it does not lead to the formation of calcium complexes in the aqueous phase. This dispersing agent consists of the copolymer made up of at least one vinylic monomer and of at least one monomer having formula (I) as explained previously.

All these properties:
- the ability of said copolymer to disperse the calcium carbonate in an aqueous suspension in a stable fashion, by mechanisms of adsorption at the surface of the carbonate and of steric repulsion induced by the presence of the monomer having formula (I),
- the limitation of the presence of divalent ions in an aqueous suspension,
- the inert role of said copolymer, as a chelating agent of ions in an aqueous solution, and notably of the divalent ions such as calcium (i.e. absence of calcium complexes in the aqueous phase), are largely illustrated in the examples. The Applicant takes the liberty of stressing all these properties, and the evidence thereof which is given in the present document. Her intention is to stress that, although documents exist in the state of the art which make use of copolymers of similar chemical structure, none of them reveals or suggests for these copolymers the function of a steric dispersing agent and the properties listed above which arise from this function.

Thus, the Applicant is familiar with documents EP 1 294 476, EP 1 572 764, EP 1 565 504, EP 1 569 970 and EP 0 892 020, which teach that copolymers containing:
- at least one ethylenically-unsaturated monomer,
- and at least one non-ionic monomer having formula (I), but whose range of possibility is much broader than in the present Application, may be used as mineral material dispersing agents.

Firstly, none of these documents concerns the same technical problem as the one addressed in the present Application: there is therefore no objective element which enabled them to be considered in the state of the technique relative to the present Application.

Secondly, even if the person skilled in the art were aware of these documents, he would not have found in them any indication revealing or suggesting to him that the copolymers of the present invention are steric dispersing agents of mineral materials in an aqueous suspension, inert with respect to the chelating of ions in a solution, and thus leading to a reduction of the quantity of these ions in the solution.

Lastly, nothing indicates or suggests in these documents the particular choice of group R', as defined in the object of the present Application.

The copolymers, as used in the present invention, thus make it possible:
- for the particles of mineral material (and notably calcium carbonate) to be dispersed in a stable manner in an aqueous medium, by mechanisms of adsorption on the surface of the mineral particles, and of steric repulsion caused by the presence of monomers of formula (I), and at the same time,
- for the presence of divalent ions in the aqueous phase, particularly including calcium ions, to be limited,
- for this goal to be achieved without using the chelating agents of the prior art (such as phosphated compounds, or the polycarboxylic acids such as polyacrylic acid), which lead to the formation of complexes which remain undesirable in papermaking facilities.

Lastly, there is a final technical advantage related to the use of the inventive polymers with a view to manufacturing dispersions and aqueous suspensions of calcium carbonate, intended to be used as mass fillers. As the examples herein clearly demonstrate, the inventive polymers make it possible to significantly increase the phenomenon of filler retention when compared to polymers of the prior art. The inventive polymers, which were developed as agents to substitute for the chelating agents of the prior art that led to excessive quantities of insoluble complexes in the aqueous phase, have also proven very effective for the purpose of improving the phenomenon of filler retention: nothing in the state of the art disclosed or suggested such effectiveness.

Thus, a first purpose of the invention is the use, as a steric dispersing agent of at least one mineral material in water, of a copolymer characterized in that it is made up of:
a) at least one vinyl monomer,
b) and of at least one non-ionic monomer, whose formula (I) is:

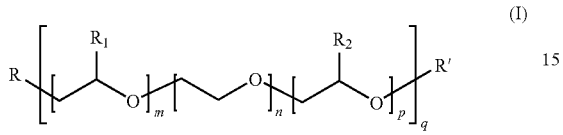

where:
m and p represent a number of alkylene oxide units less than or equal to 150,
n represents a number of ethylene oxide units less than or equal to 150,
q represents an integer at least equal to 1 and such that $5 \leq (m+n+p)q \leq 150$, and preferentially such that $15 \leq (m+n+p)q \leq 120$,
$R_1$ represents hydrogen or the methyl or ethyl radical,
$R_2$ represents hydrogen or the methyl or ethyl radical,
R represents a radical containing an unsaturated polymerizable function, preferentially belonging to the group of vinylics, or to the group of acrylic, methacrylic, maleic, itaconic, crotonic, vinylphthalic esters, or to the group of unsaturated urethanes such as acrylurethane, methacrylurethane, $\alpha$-$\alpha'$ dimethyl-isopropenyl-benzylurethane, allylurethane, or to the group of allylic or vinylic ethers, whether or not substituted, or to the group of ethylenically unsaturated amides or imides, or to the group constituted by acrylamide and methacrylamide,
R' represents hydrogen or a hydrocarbonated radical having 1 to 40 carbon atoms, preferentially 1 to 12 carbon atoms, and very preferentially 1 to 4 carbon atoms, and where R' is extremely preferentially the methyl radical,
or a mixture of several monomers that have formula (I).

This use is further characterized in that said copolymer consists, expressed as a percentage by weight of the monomers:
a) of 0.5% to 50%, preferentially 1% to 25%, and very preferentially 5% to 20%, of at least one vinylic monomer,
b) of 50% to 99.5%, preferentially 75% to 99%, and very preferentially 80% to 95%, of at least one non-ionic monomer, that has formula (I):

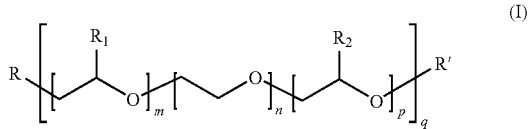

where:
m and p represent a number of alkylene oxide units less than or equal to 150,
n represents a number of ethylene oxide units less than or equal to 150,
q represents an integer at least equal to 1 and such that $5 \leq (m+n+p)q \leq 150$, and preferentially such that $15 \leq (m+n+p)q \leq 120$,
$R_1$ represents hydrogen or the methyl or ethyl radical,
$R_2$ represents hydrogen or the methyl or ethyl radical,
R represents a radical containing an unsaturated polymerizable function, preferentially belonging to the group of vinylics, or to the group of acrylic, methacrylic, maleic, itaconic, crotonic, vinylphthalic esters, or to the group of unsaturated urethanes such as acrylurethane, methacrylurethane, $\alpha$-$\alpha'$ dimethyl-isopropenyl-benzylurethane, allylurethane, or to the group of allylic or vinylic ethers, whether or not substituted, or to the group of ethylenically unsaturated amides or imides, or to the group constituted by acrylamide and methacrylamide,
R' represents hydrogen or a hydrocarbonated radical having 1 to 40 carbon atoms, preferentially 1 to 12 carbon atoms, and very preferentially 1 to 4 carbon atoms, and where R' is extremely preferentially the methyl radical,
or a mixture of several monomers that have formula (I), where the sum of the percentages of monomers a) and b) is equal to 100%.

This use is further characterized in that the vinylic monomer a) is chosen from among (meth)acrylic acid, or from among the (meth)acrylic esters, such as preferentially the acrylates and methacrylates having 1 to 20 carbon atoms in their ester radical, such as very preferentially the methyl, ethyl, isopropyl, n-propyl, isobutyl, n-butyl, ter-butyl, 2-ethylhexyl acrylates, the methyl or ethyl methacrylates, the hydroxylated methacrylates such as the hydroxyethyl and hydroxypropyl methacrylates, or from among the (meth)acrylamides, or from among the aromatic vinylic monomers, such as preferentially styrene, $\alpha$-methylstyrene, or from among the (meth)acrylic esters of cationic monomers, such as preferentially of [2-(methacryloyloxy)ethyl]trimethyl ammonium chloride or sulfate, [3-(acrylamido)propyl]trimethyl ammonium chloride or sulfate, dimethyl diallyl ammonium chloride or sulfate, [3-(methacrylamido)propyl]trimethyl ammonium chloride or sulfate, or from among the mixtures of these monomers.

In a first variant, the inventive use is characterized in that the vinylic monomer a) is acrylic acid.

In a second variant, the inventive use is characterized in that the vinylic monomer a) is methacrylic acid.

In a third variant, the inventive use is characterized in that the vinylic monomer a) is acrylamide.

In a fourth variant, the inventive use is characterized in that the vinylic monomer a) is methacrylamide.

In a fifth variant, the inventive use is characterized in that the vinylic monomer a) is a (meth)acrylic ester of cationic monomers, such as preferentially [2-(methacryloyloxy)ethyl]trimethyl ammonium chloride or sulfate, [2-(acryloyloxy)ethyl]trimethyl ammonium chloride or sulfate, [3-(acrylamido)propyl]trimethyl ammonium chloride or sulfate, dimethyl diallyl ammonium chloride or sulfate, or [3-(methacrylamido) propyl]trimethyl ammonium chloride or sulfate.

This use is further characterized in that said copolymer is obtained in an acidic and possibly distilled form, and is partially or totally neutralized by one or more neutralization agents having a monovalent or polyvalent cation, said agents being preferentially chosen from among ammonia or from among calcium, sodium, magnesium, potassium or lithium hydroxides and/or oxides, or from among the aliphatic and/or cyclic primary, secondary or tertiary amines, such as preferentially stearylamine, the ethanolamines (mono-, di- and tri-ethanolamine), mono- and diethylamine, cyclohexylamine, methylcyclohexylamine, amino methyl propanol, morpholine, and preferentially in that the neutralization agent is chosen from among lithium hydroxide and/or oxide.

This use is further characterized in that said copolymer is obtained by processes of radical polymerization in solution, in a direct or inverse emulsion, in a suspension or precipitation in solvents, in the presence of catalytic systems and chain transfer agents, or by controlled radical polymerization methods, and preferentially by nitroxide mediated polymerization (NMP) or by cobaloximes, by atom transfer radical polymerization (ATRP), by controlled radical polymerization by sulfurated derivatives, chosen from among carbamates, dithioesters or trithiocarbonates (RAFT) or xanthates.

This use is further characterised in that the said copolymer may, before or after the total or partial neutralization reaction, be treated and separated into several phases, using static or dynamic processes, by one or more polar solvents preferentially belonging to the group made up of water, methanol, ethanol, propanol, isopropanol, butanols, acetone, tetrahydrofuran or mixtures thereof.

The inventive use of a steric dispersing agent of at least one mineral material in is further characterized in that the mineral material is chosen from among natural or synthetic calcium carbonate, dolomites, limestone, kaolin, talc, gypsum, lime, magnesium, titanium dioxide, satin white, barium sulfate, aluminum trioxide or aluminum trihydroxide, silicas, mica and a mixture of more than one of these fillers, such as talc-calcium carbonate, calcium carbonate-kaolin mixtures, or mixtures of calcium carbonate with aluminum trihydroxide or aluminum trioxide, or mixtures with synthetic or natural fibers, or mineral co-structures such as talc-calcium carbonate or talc-titanium dioxide structures, or mixtures thereof, and in that said mineral material is chosen preferentially from among natural or synthetic calcium carbonate or talc or mixtures thereof, and in that it is very preferentially chosen from among natural or synthetic calcium carbonate or mixtures thereof.

This use is lastly characterized in that 0.05% to 5%, preferentially 0.1% to 3%, and very preferentially 0.3% to 1.5%, by dry weight of said copolymer, relative to the dry weight of mineral material, is used.

Another object of the invention consists in the aqueous suspensions and/or dispersions of at least one mineral material, characterized in that they contain, as a steric dispersing agent of said mineral material, a copolymer consisting:
a) at least one vinyl monomer,
b) and of at least one non-ionic monomer, whose formula (I) is:

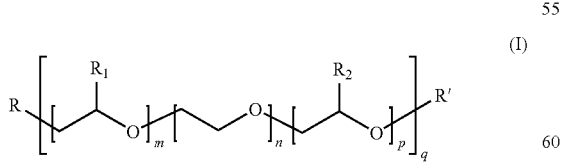

where:
m and p represent a number of alkylene oxide units less than or equal to 150,
n represents a number of ethylene oxide units less than or equal to 150,
q represents an integer at least equal to 1 and such that $5 \leq (m+n+p)q \leq 150$, and preferentially such that $15 \leq (m+n+p)q \leq 120$,
$R_1$ represents hydrogen or the methyl or ethyl radical,
$R_2$ represents hydrogen or the methyl or ethyl radical,
R represents a radical containing an unsaturated polymerizable function, preferentially belonging to the group of vinylics, or to the group of acrylic, methacrylic, maleic, itaconic, crotonic, vinylphthalic esters, or to the group of unsaturated urethanes such as acrylurethane, methacrylurethane, α-α' dimethyl-isopropenyl-benzylurethane, allylurethane, or to the group of allylic or vinylic ethers, whether or not substituted, or to the group of ethylenically unsaturated amides or imides, or to the group constituted by acrylamide and methacrylamide,
R' represents hydrogen or a hydrocarbonated radical having 1 to 40 carbon atoms, preferentially 1 to 12 carbon atoms, and very preferentially 1 to 4 carbon atoms, and where R' is extremely preferentially the methyl radical,
or a mixture of several monomers having formula (I).

These aqueous suspensions and/or dispersions are further characterized in that said copolymer consists, expressed as a percentage by weight of the monomers:
a) of 0.5% to 50%, preferentially 1% to 25%, and very preferentially 5% to 20%, of at least one vinylic monomer,
b) of 50% to 99.5%, preferentially 75% to 99%, and very preferentially 80% to 95%, of at least one non-ionic monomer, having formula (I):

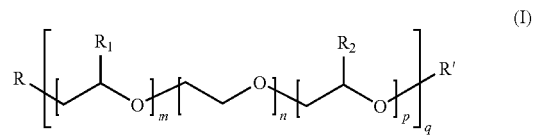

where:
m and p represent a number of alkylene oxide units less than or equal to 150,
n represents a number of ethylene oxide units less than or equal to 150,
q represents an integer at least equal to 1 and such that $5 \leq (m+n+p)q \leq 150$, and preferentially such that $15 \leq (m+n+p)q \leq 120$,
$R_1$ represents hydrogen or the methyl or ethyl radical,
$R_2$ represents hydrogen or the methyl or ethyl radical,
R represents a radical containing an unsaturated polymerizable function, preferentially belonging to the group of vinylics, or to the group of acrylic, methacrylic, maleic, itaconic, crotonic, vinylphthalic esters, or to the group of unsaturated urethanes such as acrylurethane, methacrylurethane, α-α' dimethyl-isopropenyl-benzylurethane, allylurethane, or to the group of allylic or vinylic ethers, whether or not substituted, or to the group of ethylenically unsaturated amides or imides, or to the group constituted by acrylamide and methacrylamide,
R' represents hydrogen or a hydrocarbonated radical having 1 to 40 carbon atoms, preferentially 1 to 12 carbon atoms, and very preferentially 1 to 4 carbon atoms, and where R' is extremely preferentially the methyl radical, or a mixture of several monomers that have formula (I), where the sum of the percentages by weight of monomers a) and b) is equal to 100%.

These aqueous suspensions and/or dispersions are further characterized in that the vinylic monomer a) is chosen from among (meth)acrylic acid, or from among the (meth)acrylic esters, such as preferentially the acrylates and methacrylates having 1 to 20 carbon atoms in their ester radical, such as very preferentially the methyl, ethyl, isopropyl, n-propyl, isobutyl, n-butyl, ter-butyl, 2-ethylhexyl acrylates, the methyl or ethyl methacrylates, the hydroxylated methacrylates such as the hydroxyethyl and hydroxypropyl methacrylates, or from among the (meth)acrylamides, or from among the aromatic vinylic monomers, such as preferentially styrene, α-methylstyrene, or from among the (meth)acrylic esters of cationic monomers, such as preferentially of [2-(methacryloyloxy)ethyl]trimethyl ammonium chloride or sulfate, [3-(acrylamido) propyl]trimethyl ammonium chloride or sulfate, dimethyl diallyl ammonium chloride or sulfate, [3-(methacrylamido)propyl]trimethyl ammonium chloride or sulfate, or from among the mixtures of these monomers.

In a first variant, these aqueous suspensions and/or dispersions are characterized in that the vinylic monomer a) is acrylic acid.

In a second variant, these aqueous suspensions and/or dispersions are characterized in that the vinylic monomer a) is methacrylic acid.

In a third variant, these aqueous suspensions and/or dispersions are characterized in that the vinylic monomer a) is acrylamide.

In a fourth variant, these aqueous suspensions and/or dispersions are characterized in that the vinylic monomer a) is methacrylamide.

In a fifth variant, these aqueous suspensions and/or dispersions are characterized in that the vinylic monomer a) is a (meth)acrylic ester of cationic monomers, such as preferentially [2-(methacryloyloxy)ethyl]trimethyl ammonium chloride or sulfate, [2-(acryloyloxy)ethyl]trimethyl ammonium chloride or sulfate, [3-(acrylamido)propyl]trimethyl ammonium chloride or sulfate, dimethyl diallyl ammonium chloride or sulfate, or [3-(methacrylamido)propyl]trimethyl ammonium chloride or sulfate.

These aqueous suspensions and/or dispersions are further characterized in that said copolymer is obtained in an acidic and possibly distilled form, and is partially or totally neutralized by one or more neutralization agents having a monovalent or polyvalent cation, said agents being preferentially chosen from among ammonia or from among calcium, sodium, magnesium, potassium or lithium hydroxides and/or oxides, or from among the aliphatic and/or cyclic primary, secondary or tertiary amines, such as preferentially stearylamine, the ethanolamines (mono-, di- and triethanolamine), mono- and diethylamine, cyclohexylamine, methylcyclohexylamine, amino methyl propanol, morpholine, and preferentially in that the neutralization agent is chosen from among lithium hydroxide and/or oxide.

These aqueous suspensions and/or dispersions are further characterized in that said copolymer is obtained by processes of radical polymerization in solution, in a direct or inverse emulsion, in a suspension or precipitation in solvents, in the presence of catalytic systems and chain transfer agents, or by controlled radical polymerization methods, and preferentially by nitroxide mediated polymerization (NMP) or by cobaloximes, by atom transfer radical polymerization (ATRP), by controlled radical polymerization by sulfurated derivatives, chosen from among carbamates, dithioesters or trithiocarbonates (RAFT) or xanthates.

These aqueous suspensions and/or dispersions are further characterized in that said copolymer may be, before or after the total or partial neutralization reaction, be treated and separated into several phases, using static or dynamic processes, by one or more polar solvents preferentially belonging to the group made up of water, methanol, ethanol, propanol, isopropanol, butanols, acetone, tetrahydrofuran or mixtures thereof. These aqueous suspensions and/or dispersions are further characterized in that the mineral material is chosen from among natural or synthetic calcium carbonate, dolomites, limestone, kaolin, talc, gypsum, lime, magnesium, titanium dioxide, satin white, barium sulfate, aluminum trioxide or aluminum trihydroxide, silicas, mica and a mixture of more than one of these fillers, such as talc-calcium carbonate, calcium carbonate-kaolin mixtures, or mixtures of calcium carbonate with aluminum trihydroxide or aluminum trioxide, or mixtures with synthetic or natural fibers, or mineral costructures such as talc-calcium carbonate or talc-titanium dioxide structures, or mixtures thereof, and in that said mineral material is chosen preferentially from among natural or synthetic calcium carbonate or talc or mixtures thereof, and in that it is very preferentially chosen from among natural or synthetic calcium carbonate or mixtures thereof.

These aqueous suspensions and/or dispersions are further characterized in that they have, when the mineral material is a calcium carbonate, a calcium ion content in the aqueous phase of less than 30 ppm, and preferentially less than 15 ppm.

These aqueous suspensions and/or dispersions are further characterized in that they contain 0.05% to 5%, preferentially 0.1% to 3%, and very preferentially 0.3% to 1.5%, by dry weight of said copolymer, relative to the dry weight of mineral material.

Another object of the invention is a method for manufacturing a sheet of paper from a pulp, said pulp being derived from a mixture of natural and/or synthetic fibers, water, and at least one aqueous suspension and/or dispersion of at least one mineral material, characterized in that said dispersion and/or suspension contains, as a steric dispersing agent of said mineral material, at least one copolymer consisting:
a) at least one vinyl monomer,
b) and of at least one non-ionic monomer, whose formula (I) is:

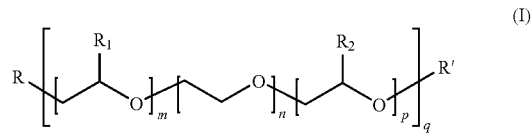

where:
m and p represent a number of alkylene oxide units less than or equal to 150,
n represents a number of ethylene oxide units less than or equal to 150,
q represents an integer at least equal to 1 and such that 5≦(m+n+p)q≦150, and preferentially such that 15≦(m+n+p)q≦120,
$R_1$ represents hydrogen or the methyl or ethyl radical,
$R_2$ represents hydrogen or the methyl or ethyl radical,
R represents a radical containing an unsaturated polymerizable function, preferentially belonging to the group of vinylics, or to the group of acrylic, methacrylic, maleic, itaconic, crotonic, vinylphthalic esters, or to the group of unsaturated urethanes such as acrylurethane, methacrylurethane, α-α' dimethyl-isopropenyl-benzylurethane, allylurethane, or to the group of allylic or vinylic ethers, whether or not substituted, or to the group of ethylenically unsaturated amides or imides, or to the group constituted by acrylamide and methacrylamide, R' represents hydrogen or a hydrocarbonated radical having 1 to 40 carbon atoms, preferentially 1 to 12 carbon atoms, and very preferentially 1 to 4 carbon atoms, and where R' is extremely preferentially the methyl radical, or a mixture of several monomers having formula (I).

Naturally, a person skilled in the art may add other additives with which he is familiar to the manufacture of said pulp.

This method is further characterized in that said copolymer consists, expressed as a percentage by weight of the monomers:

a) of 0.5% to 50%, preferentially 1% to 25%, and very preferentially 5% to 20%, of at least one vinylic monomer, b) of 50% to 99.5%, preferentially 75% to 99%, and very preferentially 80% to 95%, of at least one non-ionic monomer, having formula (I):

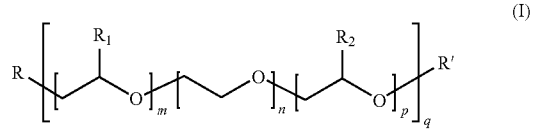

where:
m and p represent a number of alkylene oxide units less than or equal to 150,
n represents a number of ethylene oxide units less than or equal to 150,
q represents an integer at least equal to 1 and such that $5 \leq (m+n+p)q \leq 150$, and preferentially such that $15 \leq (m+n+p)q \leq 120$,
$R_1$ represents hydrogen or the methyl or ethyl radical,
$R_2$ represents hydrogen or the methyl or ethyl radical,
R represents a radical containing an unsaturated polymerizable function, preferentially belonging to the group of vinylics, or to the group of acrylic, methacrylic, maleic, itaconic, crotonic, vinylphthalic esters, or to the group of unsaturated urethanes such as acrylurethane, methacrylurethane, α-α' dimethyl-isopropenyl-benzylurethane, allylurethane, or to the group of allylic or vinylic ethers, whether or not substituted, or to the group of ethylenically unsaturated amides or imides, or to the group constituted by acrylamide and methacrylamide,
R' represents hydrogen or a hydrocarbonated radical having 1 to 40 carbon atoms, preferentially 1 to 12 carbon atoms, and very preferentially 1 to 4 carbon atoms, and where R' is extremely preferentially the methyl radical,
or a mixture of several monomers that have formula (I), where the sum of the percentages by weight of monomers a) and b) is equal to 100%.

This method is further characterized in that the vinylic monomer a) is chosen from among (meth)acrylic acid, or from among the (meth)acrylic esters, such as preferentially the acrylates and methacrylates having 1 to 20 carbon atoms in their ester radical, such as very preferentially the methyl, ethyl, isopropyl, n-propyl, isobutyl, n-butyl, ter-butyl, 2-ethylhexyl acrylates, the methyl or ethyl methacrylates, the hydroxylated methacrylates such as the hydroxyethyl and hydroxypropyl methacrylates, or from among the (meth)acrylamides, or from among the aromatic vinylic monomers, such as preferentially styrene, α-methylstyrene, or from among the (meth)acrylic esters of cationic monomers, such as preferentially of [2-(methacryloyloxy)ethyl]trimethyl ammonium chloride or sulfate, [3-(acrylamido)propyl]trimethyl ammonium chloride or sulfate, dimethyl diallyl ammonium chloride or sulfate, [3-(methacrylamido)propyl]trimethyl ammonium chloride or sulfate, or from among the mixtures of these monomers.

In a first variant, the inventive method is characterized in that the vinylic monomer a) is acrylic acid.

In a second variant, the inventive method is characterized in that the vinylic monomer a) is methacrylic acid.

In a third variant, the inventive method is characterized in that the vinylic monomer a) is acrylamide.

In a fourth variant, the inventive method is characterized in that the vinylic monomer a) is methacrylamide.

In a fifth variant, the inventive method is characterized in that the vinylic monomer a) is a (meth)acrylic ester of cationic monomers, such as preferentially [2-(methacryloyloxy)ethyl]trimethyl ammonium chloride or sulfate, [2-(acryloyloxy)ethyl]trimethyl ammonium chloride or sulfate, [3-(acrylamido)propyl]trimethyl ammonium chloride or sulfate, dimethyl diallyl ammonium chloride or sulfate, or [3-(methacrylamido)propyl]trimethyl ammonium chloride or sulfate.

This method is further characterized in that said copolymer is obtained in an acidic and possibly distilled form, and is partially or totally neutralized by one or more neutralization agents having a monovalent or polyvalent cation, said agents being preferentially chosen from among ammonia or from among calcium, sodium, magnesium, potassium or lithium hydroxides and/or oxides, or from among the aliphatic and/or cyclic primary, secondary or tertiary amines, such as preferentially stearylamine, the ethanolamines (mono-, di- and triethanolamine), mono- and diethylamine, cyclohexylamine, methylcyclohexylamine, amino methyl propanol, morpholine, and preferentially in that the neutralization agent is chosen from among lithium hydroxide and/or oxide.

This method is further characterized in that said copolymer is obtained by radical polymerization processes in a solution, in a direct or inverse emulsion, in a suspension or precipitation in solvents, in the presence of catalytic systems and chain transfer agents, or by controlled radical polymerization methods, and preferentially by nitroxide mediated polymerization (NMP) or by cobaloximes, by atom transfer radical polymerization (ATRP), by controlled radical polymerization by sulfurated derivatives, chosen from among carbamates, dithioesters or trithiocarbonates (RAFT) or xanthates.

This method is further characterized in that said copolymer may, before or after the total or partial neutralization reaction, be treated and separated into several phases, using static or dynamic processes, by one or more polar solvents belonging preferentially to the group made up of water, methanol, ethanol, propanol, isopropanol, the butanols, acetone, tetrahydrofuran or mixtures thereof.

These aqueous suspensions and/or dispersions are further characterized in that the mineral material is chosen from among natural or synthetic calcium carbonate, dolomites, limestone, kaolin, talc, gypsum, lime, magnesium, titanium dioxide, satin white, barium sulfate, aluminum trioxide or aluminum trihydroxide, silicas, mica and a mixture of more than one of these fillers, such as talc-calcium carbonate, calcium carbonate-kaolin mixtures, or mixtures of calcium carbonate with aluminum trihydroxide or aluminum trioxide, or mixtures with synthetic or natural fibers, or mineral co-structures such as talc-calcium carbonate or talc-titanium dioxide structures, or mixtures thereof, and in that said mineral material is chosen preferentially from among natural or synthetic calcium carbonate or talc or mixtures thereof, and in that it is very preferentially chosen from among natural or synthetic calcium carbonate or mixtures thereof.

This method is further characterized in that the dispersions and/or suspensions of mineral material have, when the mineral material is a calcium carbonate, a calcium ion content in the aqueous phase of less than 30 ppm, and preferentially less than 15 ppm.

This method is further characterized in that the aqueous suspensions and/or dispersions of at least one mineral material contain 0.05% to 5%, preferentially 0.1% to 3%, and very preferentially 0.3% to 1.5%, by dry weight of said copolymer, relative to the dry weight of mineral material.

This method is further characterized in that the pH of the paper pulp is under 9, preferentially 8, and very preferentially 7.5.

This method is then characterized in that the pH of the paper pulp is adjusted by means of a weak acid preferentially chosen from among carbon dioxide and/or phosphoric acid.

Another object of the invention consists in the sheets of paper obtained by the inventive method.

EXAMPLES

In all the examples, the molecular weight of the polymers used is determined according to the method explained below, by Steric Exclusion Chromatography (SEC).

1 mL of the polymer solution is put on a capsule, and then evaporated at ambient temperature in a vane pump vacuum. The solute is recovered by 1 mL of the SEC eluent, and the whole is then injected in the SEC equipment. The SEC eluent is a solution of $NaHCO_3$: 0.05 mole/L, $NaNO_3$: 0.1 mole/L, triethylamine 0.02 mole/L, $NaN_3$ 0.03% by mass. The SEC line contains an isocratic pump (Waters™ 515) the flow rate of which is regulated at 0.5 mL/min., a kiln containing a "Guard Column Ultrahydrogel Waters™" precolumn, an "Ultrahydrogel Waters™" linear column with an internal diameter of 7.8 mm and 30 cm in length, and a RI Waters™ 410 refractometric detector. The kiln is heated to a temperature of 60° C. and the refractometer to 50° C. The chromatogram's detection and processing application is the SECential application, supplied by "L.M.O.P.S. CNRS, Chemin du Canal, Vernaison, 69277". The SEC is calibrated by a series of 5 sodium poly(acrylate) standards supplied by Polymer Standards Service™

Example 1

The purpose of this example is to illustrate the inventive use of a copolymer as a steric dispersing agent of a natural calcium carbonate, where said calcium carbonate is dispersed in an aqueous medium.

This example also illustrates the inventive aqueous dispersions of calcium carbonate.

The purpose of this example is also to illustrate that the aqueous dispersions of calcium carbonate thereby obtained are stable over time.

The purpose of this example is also to illustrate that the inventive use of copolymers very appreciably reduces the quantity of calcium ions in the aqueous phase of the dispersion of calcium carbonate, relative to this same quantity measured in connection with a dispersion of calcium carbonate made with chelating dispersing agents of the prior art.

In each of the tests #1 to 7, one commences by dispersing, according to the methods well-known to the person skilled in the art, a natural calcium carbonate which is a Norwegian marble, the particle size distribution of which is such that 65% by weight of the particles have an average diameter of less than 1 μm, as measured with a Sedigraph™ 5100 device sold by the company MICROMERITICS™.

One thereby obtains an aqueous dispersion whose content by dry weight of calcium carbonate is equal to 65% of its total weight.

Test #1

This test illustrates the prior art.

It uses 0.33% by weight, relative to the dry weight of calcium carbonate, of a polyacrylic acid totally neutralized by sodium hydroxide, whose molecular weight is equal to 5,500 g/mole.

Test #2

This test illustrates the prior art.

It uses 0.33% by weight, relative to the dry weight of calcium carbonate, of a polyacrylic acid totally neutralized by sodium hydroxide, whose molecular weight is equal to 12,000 g/mole.

Test #3

This test illustrates the prior art.

It uses 0.33% by weight, relative to the dry weight of calcium carbonate, of a copolymer consisting of 69% by weight of acrylic acid and of 31% by weight of maleic anhydride, totally neutralized by sodium hydroxide, wand whose molecular weight is equal to 13,500 g/mole.

Test #4

This test illustrates the invention.

It uses 0.33% by weight, relative to the dry weight of calcium carbonate, of a copolymer made up of:
a) 13.7% by weight of acrylic acid and 1.6% by weight of methacrylic acid,
b) 84.7% by weight of methoxy polyethylene glycol methacrylate whose molecular weight is 5,000 g/mole,
totally neutralized by sodium hydroxide, and whose molecular weight is equal to 32,500 g/mole.

Test #5

This test illustrates the invention.

It uses 0.33% by weight, relative to the dry weight of calcium carbonate, of a copolymer made up of:
a) 13.6% by weight of acrylic acid and 4.9% by weight of methacrylic acid,
b) 81.5% by weight of methoxy polyethylene glycol methacrylate whose molecular weight is 2,000 g/mole,
totally neutralized by sodium hydroxide, and whose molecular weight is equal to 42 g/mole.

Test #6

This test illustrates the invention.

It uses 0.33% by weight, relative to the dry weight of calcium carbonate, of a copolymer made up of:
a) 13.7% by weight of acrylic acid and 1.6% by weight of methacrylic acid,
b) 84.7% by weight of methoxy-polyethylene glycol methacrylate whose molecular weight is 5,000 g/mole,
totally neutralized by lithium, and whose molecular weight is equal to 32,000 g/mole.

Test #7

This test illustrates the invention.

It uses 0.33% by weight, relative to the dry weight of calcium carbonate, of a copolymer made up of:
a) 13.0% by weight of acrylamide,
b) 87.0% by weight of oxyethylene and oxypropylene methacrylate (in a ratio of 90/10 by weight), whose molecular weight is 3,000 g/mole, non-neutralized, and whose molecular weight is equal to 38,000 g/mole.

For each test, the following are then determined:
the Brookfield™ viscosities, measured at 25° C., and at 10 and 100 rpm with the appropriate module, at time t=0, respectively denoted $\mu_{10}$ (t0) and $\mu_{100}$ (t0),
the Brookfield™ viscosities, measured at 25° C., and at 10 and 100 rpm with the appropriate module, at time t=8 days before stirring the suspension, respectively denoted $\mu_{10}$ (t8 BFAG) and $\mu_{100}$ (t8 BFAG),
the Brookfield™ viscosities, measured at 25° C., and at 10 and 100 rpm with the appropriate module, at time t=8 days after stirring the suspension for 1 minute, respectively denoted $\mu_{10}$ (t8 AFAG) and $\mu_{100}$ (t8 AFAG), The calcium ion and magnesium ion concentration of the aqueous phase are then also determined by capillary electrophoresis, with a Beckman™ MDQ device, using UV detection at a wavelength of 457 nm.

The sample is injected by pressurization for 5 seconds.

The measurement is taken at a temperature of 30° C. and the intensity of the current is 30 kV.

The capillary is made from cast silica, with a diameter of 75 µm and a length of 50 cm.

The electrolyte has a pH of 4.5 and is a mixture of crown ether 18C6 (50 millimolars) and of imidazoline (10 millimolars).

All these results are shown in table 1.

TABLE 1

| | | Test no. | | | | | | |
|---|---|---|---|---|---|---|---|---|
| | | 1 | 2 | 3 | 4 | 5 | 6 | 7 |
| Prior Art (PA)/Invention (IN) | | PA | PA | PA | IN | IN | IN | IN |
| Brookfield ™ Viscosities | $\mu_{10}$ (t0) | 2500 | 2300 | 1090 | 500 | 1750 | 510 | 1800 |
| | $\mu_{100}$ (t0) | 600 | 500 | 220 | 200 | 400 | 200 | 500 |
| | $\mu_{10}$ (t8BFAG) | 4500 | 4100 | 3820 | 2060 | 2800 | 2120 | 2040 |
| | $\mu_{100}$ (t8BFAG) | 1000 | 870 | 740 | 480 | 590 | 480 | 490 |
| | $\mu_{10}$ (t8AFAG) | 3200 | 2800 | 1850 | 610 | 1250 | 620 | 620 |
| | $\mu_{100}$ (t8AFAG) | 810 | 660 | 310 | 250 | 300 | 270 | 280 |
| [Ca$^{2+}$] (ppm) | | 83 | 70 | 65 | 7 | 6 | 7 | 6 |
| [Mg$^{2+}$] (ppm) | | 8 | 6 | 4 | 1 | 1 | 1 | 1 |

These results demonstrate that the inventive copolymers:
enable the creation of aqueous suspensions of calcium carbonate which are dispersed and stable over time; as such, tests #4 and 6 even lead to the lowest Brookfield™ viscosities;
enable the significant limitation of the quantity of calcium and magnesium ions in the aqueous phase, relative to homopolymers of acrylic acid found in the prior art (represented by tests #1 and 2), and to a copolymer of acrylic acid and of maleic anhydride found in the prior art (represented by test #3)

These results therefore illustrate the merits of the Applicant, who has succeeded in developing the use of a copolymer as a steric dispersing agent of natural calcium carbonate, and which limits the presence of the divalent ions in the aqueous phase of the calcium carbonate dispersion obtained.

Example 2

The purpose of this example is to demonstrate that the copolymers which are used in the present invention do not lead to the formation of soluble chelates of calcium in the aqueous phase, unlike the polymers of the prior art, particularly including a homopolymer of acrylic acid and a copolymer of acrylic acid and of maleic anhydride, these polymers being well-known dispersing and chelating agents of the prior art.

A test is therefore carried out, the purpose of which is to demonstrate the chelating power of polymers, in terms of forming soluble chelates of calcium.

To do so, the following are introduced into a beaker:
the polymer for testing (0.5 g),
permuted water (20 ml),
a solution of sodium carbonate at 0.5 mole/L (20 mL),
a solution of sodium hydroxide at 0.1 mole/L (qsp pH=11), A solution of calcium acetate is then introduced into this beaker, drop by drop, and the turbidity of the medium is monitored by means of a photometer. After the addition of each drop of calcium acetate the photometer waits for the turbidity to stabilize before measuring it.

For an agent forming soluble chelates of calcium, the transmittance does not vary, as long as the quantity of said agent is sufficiently great to form these soluble calcium chelates. This chelation reaction is in fact in competition with the calcium carbonate precipitation reaction. For a certain volume of calcium acetate introduced, calcium carbonate precipitation irreversibly occurs, and turbidity is observed in the medium: The added solution's volume $V_{equ.}$, from which the calcium carbonate precipitation irreversibly occurred, is thereby determined: this is the volume from which a sudden decrease in transmittance is observed.

For a non-chelating agent of calcium, calcium carbonate precipitation is immediate, i.e. it occurs beginning with the first drop of calcium acetate added.

This test is therefore perfectly suitable for determining the capacity of the polymer to form soluble chelates of calcium, despite the high propensity of calcium carbonate to precipitate in an aqueous medium.

Test #8

This test illustrates the prior art and uses a copolymer consisting of 69% by weight of acrylic acid and of 31% by weight of maleic anhydride, totally neutralized by sodium hydroxide, and whose molecular weight is equal to 13,500 g/mole.

Test #9

This test illustrates the prior art and uses a homopolymer of acrylic acid, totally neutralized by sodium hydroxide, and whose molecular weight is equal to 4,000 g/mole.

Test #10

This test illustrates the prior art and uses ethylene-diamine-tetracetic acid (EDTA).

Test #11

This test illustrates the invention and uses a copolymer made up of:
- a) 13.6% by weight of acrylic acid and 4.9% by weight of methacrylic acid,
- b) 81.5% by weight of methoxy-polyethylene glycol methacrylate whose molecular weight is 2,000 g/mole, totally neutralized by sodium hydroxide, and whose molecular weight is equal to 42 g/mole.

Test #12

This test illustrates the invention and uses a copolymer made up of:
- a) 13.7% by weight of acrylic acid and 1.6% by weight of methacrylic acid,
- b) 84.7% by weight of methoxy-polyethylene glycol methacrylate whose molecular weight is 5,000 g/mole, totally neutralized by sodium hydroxide, and whose molecular weight is equal to 32,500 g/mole.

Test #13

This test illustrates the invention and uses a copolymer made up of:
- a) 13.0% by weight of acrylamide,
- b) 87.0% by weight of oxyethylene and oxypropylene methacrylate (in a ratio of 90/10 by weight), whose molecular weight is 3,000 g/mole, non-neutralized, and whose molecular weight is equal to 38,000 g/mole.

Table 2 indicates the values of $V_{equ.}$ (in ml) obtained for each of the tests #8 to 13.

TABLE 2

| | Test no. | | | | | |
|---|---|---|---|---|---|---|
| | 8 | 9 | 10 | 11 | 12 | 13 |
| Prior Art (PA)/Invention (IN) | PA | PA | PA | IN | IN | IN |
| $V_{equ.}$ (ml) | 3.5 | 4.7 | 7.6 | <0.2 | <0.2 | <0.2 |

In tests #11, 12, and 13 only, the solution contained in the beaker becomes turbid as soon as the first drop of the solution of calcium acetate is added.

For the three polymers corresponding to tests #11, 12, and 13, the volume of solution of calcium acetate for which calcium carbonate precipitation is observed is below the measurement threshold of the method (the volume of each drop of calcium acetate introduced is estimated at 0.2 ml).

Consequently, calcium carbonate precipitation is not affected by the inventive polymers used in tests #11, 12, and 13: these polymers do not therefore lead to the formation of soluble chelates of calcium in the aqueous phase.

Example 3

The purpose of this example is to demonstrate that the copolymers which are used in the present invention do not lead to the formation of insoluble chelates of calcium in the aqueous phase, unlike the polymers of the prior art, particularly including homopolymers of acrylic acid, these homopolymers being well-known dispersing and chelating agents of the prior art.

A test is therefore carried out, the purpose of which is to demonstrate the chelating power of polymers, in terms of forming insoluble chelates of calcium.

To do so, the following are introduced into a beaker:
the polymer for testing (0.5 g),
permuted water (20 ml),
a solution of sodium hydroxide at 0.1 mole/L (qsp pH=10), A solution of calcium chloride is then introduced into this beaker, drop by drop, and the turbidity of the medium is monitored by means of a photometer. After the addition of each drop of calcium chloride, the photometer waits for the turbidity to stabilize before measuring it.

This method enables the transmittance to be represented as a function of the ratio $[Ca^{2+}]/[COO^-]$.

The graphs showing calcium-chelating agents are characterised by a sudden fall of transmittance, for a certain quantity of solution of calcium chloride introduced, with this fall corresponding to the appearance of insoluble chelates of calcium obtained by flocculation.

This test is therefore perfectly suitable to determine the capacity of a polymer to form insoluble chelates of calcium in an aqueous solution, by flocculation.

The graphs (transmittance T/transmittance of the initial solution T0)=$f([Ca^{2+}]/[COO^-])$ are represented in FIG. 1/1.

Test #14

This test illustrates the invention and uses a copolymer made up of:
- a) 13.6% by weight of acrylic acid and 4.9% by weight of methacrylic acid,
- b) 81.5% by weight of methoxy-polyethylene glycol methacrylate whose molecular weight is 2,000 g/mole, totally neutralized by sodium hydroxide, and whose molecular weight is equal to 42 g/mole.

Test #15

This test illustrates the invention and uses a copolymer made up of:
- a) 13.7% by weight of acrylic acid and 1.6% by weight of methacrylic acid,
- b) 84.7% by weight of methoxy-polyethylene glycol methacrylate whose molecular weight is 5,000 g/mole, totally neutralized by sodium hydroxide, and whose molecular weight is equal to 32,500 g/mole.

Test #16

This test illustrates the invention and uses a copolymer made up of:
- a) 13.0% by weight of acrylamide,
- b) 87.0% by weight of oxyethylene and oxypropylene methacrylate (in a ratio of 90/10 by weight), whose molecular weight is 3,000 g/mole, non-neutralized, and whose molecular weight is equal to 38,000 g/mole.

Test #17

This test illustrates the prior art and uses a homopolymer of acrylic acid, totally neutralized by sodium hydroxide, and whose molecular weight is equal to 3,000 g/mole.

Test #18

This test illustrates the prior art and uses a homopolymer of acrylic acid, totally neutralized by sodium hydroxide, whose molecular weight is equal to 6,000 g/mole.

Test #19

This test illustrates the prior art and uses a homopolymer of acrylic acid, totally neutralized by sodium hydroxide, whose molecular weight is equal to 12,000 g/mole.

Examining FIG. 1/1 clearly demonstrates that, unlike homopolymers of acrylic acid of the prior art, for which a sudden reduction of transmittance is observed, meaning that insoluble chelates of calcium have been formed by flocculation, the inventive copolymers are characterized by a practically constant transmittance value: these copolymers therefore do not lead to the formation of insoluble chelates of calcium.

Example 4

This example illustrates the manufacture of paper pulp, used in the inventive method for manufacturing a sheet of paper.

To do so, for each of the tests #20 and 21 a mixture of a chemical pulp containing fibers and water and an aqueous suspension of calcium carbonate is produced, respectively according to the prior art or according to the invention, so as to obtain a percentage by dry weight of fibers and of calcium carbonate equal to 56% by total weight of the mixture To both of these tests, different quantities of a mineral filler retention agent, which is a cationic polyacrylamide, are added.

By differential weighing and by filtration of the mixtures containing the chemical pulp, the suspension of calcium carbonate and the filler retention agent, the percentage by weight of mineral fillers which have been retained within the fibers of the pulp is then determined.

Test #20

This test illustrates the prior art and uses the aqueous suspension of calcium carbonate, obtained through test #2.

Test #21

This test illustrates the prior art and uses the aqueous suspension of calcium carbonate, obtained through test #6.

The percentage by weight of particles of calcium carbonate which have been retained in the fibers is reported in table 3.

TABLE 3

| % cationic retention agent/mixture's total weight | Test #20 | Test #21 |
| --- | --- | --- |
| 0.05 | 48% | 50% |
| 0.1 | 55% | 64% |
| 0.15 | 67% | 76% |

Table 3 demonstrates that the use of the inventive aqueous suspension in the inventive method improves the retention of calcium carbonate within the fibers.

This result is all the more surprising in that the polymer of test #20 is a calcium-chelating agent (see the calcium ion concentration in table 1), which had initially been developed in order to improve the filler-retention phenomenon (see, among others, the instructions of the document WO 97/41302 on page 4 hereof). Entirely advantageously, the inventive polymer, during test 21, made it possible to reduce the calcium ion concentration in the aqueous phase (see table 1) while improving the filler-retention phenomenon.

Example 5

This example illustrates the manufacture of paper pulp, used in the inventive method for manufacturing a sheet of paper.

In order to do so, it begins by creating aqueous dispersions of a precipitated calcium carbonate (PCC) sold by the company OMYA™ under the name Omyagloss™ 2000. Specifically, an aqueous dispersion of this PCC (solids content: 17%, 62.5%, and 87.3% by weight of particles with a mean diameter respectively less than 1 μm and 2 μm, as measured by a Sedigraph™ 5100 sold by MICROMERITICS™). The resulting dispersions have a dry solids concentration equal to 50% of their total weight, using a filter-press. The resulting cakes are dispersed by using 0.6% by dry weight (compared to the calcium carbonate's dry weight) of a dispersing agent according to the prior art or the invention.

Test #22

This test illustrates the prior art and uses a homopolymer of acrylic acid, totally neutralized by sodium hydroxide, whose molecular weight is equal to 10,500 g/mole.

Test #23

This test illustrates the invention and uses a copolymer made up of:
a) 13.7% by weight of acrylic acid and 1.6% by weight of methacrylic acid,
b) 84.7% by weight of methoxy-polyethylene glycol methacrylate whose molecular weight is 5,000 g/mole,
totally neutralized by sodium hydroxide, and whose molecular weight is equal to 32,500 g/mole.

Test #24

This test illustrates the invention and uses a copolymer made up of:
a) 10.3% by weight of methacrylic acid,
b) 89.7% by weight of methoxy-polyethylene glycol methacrylate whose molecular weight is 3,000 g/mole,
totally neutralized by sodium hydroxide, and whose molecular weight is equal to 121,500 g/mole.

Test #25

This test illustrates the invention and uses a copolymer made up of:
a) 13.6% by weight of acrylic acid and 4.9% by weight of methacrylic acid,
b) 81.5% by weight of methoxy polyethylene glycol methacrylate whose molecular weight is 2,000 g/mole,
totally neutralized by sodium hydroxide, and whose molecular weight is equal to 42 g/mole.

Test #26

This test illustrates the invention and uses a copolymer made up of:
a) 21.1% by weight of methacrylic acid,
b) 78.9% by weight of methoxy-polyethylene glycol methacrylate whose molecular weight is 2,000 g/mole,
totally neutralized by sodium hydroxide, and whose molecular weight is equal to 35,2000 g/mole.

For the dispersions resulting from tests #22 to 26, the same properties as those measured in Example 1 were determined. Additionally, the light-scattering coefficient S has been determined, using the method indicated in the document WO 02/49766. The results are given in table 4.

TABLE 4

| | | Test no. | | | | |
| --- | --- | --- | --- | --- | --- | --- |
| | | 22 | 23 | 24 | 25 | 26 |
| Prior Art (PA)/Invention (IN) | | PA | IN | IN | IN | IN |
| Brookfield ™ Viscosities | $\mu_{10}$ (t0) | 260 | 2700 | 2000 | 2700 | 4390 |
| | $\mu_{100}$ (t0) | 100 | 410 | 350 | 410 | 630 |
| | $\mu_{10}$ (t8BFAG) | 1140 | 750 | 5680 | 750 | 4380 |
| | $\mu_{100}$ (t8BFAG) | 260 | 320 | 1250 | 320 | 770 |
| | $\mu_{10}$ (t8AFAG) | 1640 | 2340 | 4900 | 2340 | 3540 |
| | $\mu_{100}$ (t8AFAG) | 260 | 370 | 1000 | 370 | 550 |
| S (m²/kg) | | 218 | 234 | 235 | 219 | 223 |

These results demonstrate that the inventive copolymers:
enable the obtaining of aqueous suspensions of calcium carbonate which are dispersed and stable over time,
also enable an improved light-scattering coefficient S, when compared to the prior art.

Next, a mixture of a chemical pulp containing fibers and water and one of the previously created aqueous dispersion of PCC is created, in such a way as to achieve a percentage of fibers and calcium carbonate equal to 51.5% of the mixture's total weight, by dry weight.

Next, different quantities of a mineral load retaining agent, to with Polymin™ 540 sold by BASF™, are added into each of the mixtures.

By differential weighing and by filtration of the mixtures containing the chemical pulp, the PCC dispersion and the filler retention agent, the percentage by weight of mineral fillers which have been retained within the fibers of the pulp is then determined.

Test #27

This test illustrates the prior art and uses the aqueous dispersion of calcium carbonate obtained through test #22.

Test #28

This test illustrates the invention and uses the aqueous dispersion of calcium carbonate obtained through test #23.

Test #29

This test illustrates the invention and uses the aqueous dispersion of calcium carbonate obtained through test #24.

Test #30

This test illustrates the invention and uses the aqueous dispersion of calcium carbonate obtained through test #25.

Test #31

This test illustrates the invention and uses the aqueous dispersion of calcium carbonate obtained through test #26.

The percentage by weight of calcium carbonate particles which have been retained in the fibers is given in table 5.

TABLE 5

| % of cationic retention agent/ total weight of mixture | Test #27 | Test #28 | Test #29 | Test #30 | Test #31 |
| --- | --- | --- | --- | --- | --- |
| 0.05 | 18% | 37% | 22% | 33% | 30% |
| 0.1 | 37% | 68% | 50% | 64% | 60% |
| 0.125 | 45% | 76% | 67% | 75% | 72% |

Table 5 demonstrates that the use of the aqueous dispersion of calcium carbonate dispersed in accordance with the invention makes it possible, very significantly and entirely surprisingly, to improve calcium carbonate retention within the fibers when compared to the prior art.

Example 6

This example illustrates the manufacture of paper pulp, used in the inventive method for manufacturing a sheet of paper.

To do so, one begins by creating aqueous suspensions of a calcium carbonate (GCC) by grinding a calcite, for the purpose of achieving a dry solids content of 65%.

In each of the following tests, 0.35% by dry weight of a polymer is used as a grinding agent, compared to the calcium carbonate's total weight.

Test #32

This test illustrates the prior art, and uses a homopolymer of acrylic acid neutralized by sodium (70% of the active sites by molar weight) and by calcium (30% of the active sites by molar weight), and whose molecular weight is equal to 5,500 g/mol.

Test #33

This test illustrates the invention and uses a copolymer made up of:
a) 13.6% by weight of acrylic acid and 4.9% by weight of methacrylic acid,
b) 81.5% by weight of methoxy polyethylene glycol methacrylate whose molecular weight is 2,000 g/mole, totally neutralized by sodium hydroxide, and whose molecular weight is equal to 42 g/mole.

Test #34

This test illustrates the invention and uses a copolymer made up of:
a) 13.7% by weight of acrylic acid and 1.6% by weight of methacrylic acid,
b) 84.7% by weight of methoxy-polyethylene glycol methacrylate whose molecular weight is 5,000 g/mole, totally neutralized by sodium hydroxide, and whose molecular weight is equal to 32,500 g/mole.

Test #35

This test illustrates the invention and uses a copolymer made up of:
a) 21.1% by weight of methacrylic acid,
b) 78.9% by weight of methoxy-polyethylene glycol methacrylate whose molecular weight is 2,000 g/mole, totally neutralized by sodium hydroxide, and whose molecular weight is equal to 35,2000 g/mole.

For the suspensions obtained in tests #32 to 35, the percentages of particles whose weight is less than 1 and 2 µm, respectively denoted % <1 µm and % <2 µm, were measured after grinding. Additionally, the light-scattering coefficient S has been determined, using the method indicated in the document WO 02/49766. The results are given in table 6.

TABLE 6

| Test no. | 32 | 33 | 34 | 35 |
| --- | --- | --- | --- | --- |
| Prior Art (PA)/Invention (IN) | PA | IN | IN | IN |
| %<1 µm | 30.5 | 34.4 | 29.7 | 32.5 |
| %<2 µm | 60.4 | 69.3 | 61.7 | 66.8 |
| S (m$^2$/kg) | 94.7 | 95.0 | 104.6 | 96.7 |

These results demonstrate that the inventive copolymers make it possible to effectively grind a calcium carbonate in an aqueous medium, and to improve the light-scattering coefficient S of the resulting aqueous suspension, when compared to the prior art.

Next, a mixture of a chemical pulp containing fibers and water and of the previously obtained aqueous dispersion is created, in such a way as to achieve a percentage of fibers and calcium carbonate equal to 65% of the mixture's total weight, by dry weight. Next, different quantities of a mineral load retaining agent, to with N 74508 sold by NALCO™, are added into each of the mixtures.

By differential weighing and by filtration of the mixtures containing the chemical pulp, the PCC dispersion and the filler retention agent, the percentage by weight of mineral fillers which have been retained within the fibers of the pulp is then determined.

Test #36

This test illustrates the prior art and uses the aqueous suspension of calcium carbonate obtained through test #32.

Test #37

This test illustrates the invention and uses the aqueous suspension of calcium carbonate obtained through test #33.

Test #38

This test illustrates the invention and uses the aqueous suspension of calcium carbonate obtained through test #34.

Test #39

This test illustrates the invention and uses the aqueous suspension of calcium carbonate obtained through test #35.

The percentage by weight of calcium carbonate particles which have been retained in the fibers is given in table 7.

TABLE 7

| % of cationic retention agent/ total weight of mixture | Test #36 | Test #37 | Test #38 | Test no. 39 |
|---|---|---|---|---|
| 0.025 | 7 | 9 | 8 | 7 |
| 0.050 | 17 | 21 | 26 | 18 |
| 0.075 | 28 | 30 | 38 | 29 |
| 0.100 | 32 | 41 | 47 | 40 |
| 0.125 | 46 | 53 | 60 | 58 |
| 0.150 | 58 | 62 | 78 | 64 |

Table 5 demonstrates that the use of the inventive aqueous suspension makes it possible, very significantly and entirely surprisingly when compared to the prior art, to improve calcium carbonate retention within the fibers.

The invention claimed is:

1. A method for manufacturing a sheet of paper from pulp, comprising obtaining said pulp from a mixture of:
   natural fibers, synthetic fibers or a combination thereof, water, and at least one aqueous suspension and/or aqueous dispersion of at least one mineral material, wherein said at least one of said aqueous suspension and/or dispersion comprises, as a steric dispersing agent of said at least one mineral material, at least one copolymer having:
   a) at least one vinyl monomer; and
   b) at least one non-ionic monomer, of formula (I):

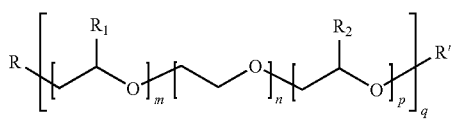

where:
m and p represent a number of alkylene oxide units less than or equal to 150,
n represents a number of ethylene oxide units less than or equal to 150,
q represents an integer at least equal to 1 wherein $5 \leqq (m+n+p)q \leqq 150$,
$R_1$ represents hydrogen or the methyl or ethyl radical,
$R_2$ represents hydrogen or the methyl or ethyl radical,
R represents a radical having an unsaturated polymerizable function,
R' represents hydrogen or a hydrocarbonated radical having 1 to 40 carbon atoms,
or a mixture of several monomers having formula (I).

2. The method according to claim 1, wherein said copolymer has, expressed as a percentage by weight of the monomers:
   a) 0.5% to 50% of at least one vinyl monomer;
   b) 50% to 99.5% of at least one non-ionic monomer, having formula (I):

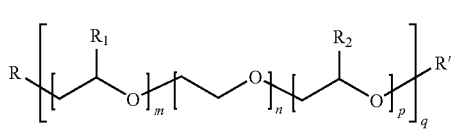

where:
m and p represent a number of alkylene oxide units less than or equal to 150,
n represents a number of ethylene oxide units less than or equal to 150,
q represents an integer at least equal to 1 wherein $5 \leqq (m+n+p)q \leqq 150$,
$R_1$ represents hydrogen or the methyl or ethyl radical,
$R_2$ represents hydrogen or the methyl or ethyl radical,
R represents a radical having an unsaturated polymerizable function,
R' represents hydrogen or a hydrocarbonated radical having 1 to 40 carbon atoms,
or a mixture of several monomers that have formula (I), wherein the sum of the percentages by weight of monomers a) and b) is equal to 100%.

3. The method according to claim 1, wherein said at least one vinyl monomer a) is selected from the group consisting of: (meth)acrylic acid; (meth)acrylic esters; (meth)acrylamides; aromatic vinylic monomers, (meth)acrylic esters of cationic monomers, and mixtures of these monomers.

4. The method according to claim 1, wherein said at least one vinylic vinyl monomer a) is acrylic acid.

5. The method according to claim 1, wherein said at least one vinyl monomer a) is methacrylic acid.

6. The method according to claim 1, wherein said at least one vinyl monomer a) is acrylamide.

7. The method according to claim 1, wherein said at least one vinyl monomer a) is methacrylamide.

8. The method according to claim 1, wherein said at least one vinyl monomer a) is a (meth)acrylic ester of at least one cationic monomer.

9. The method according to claim 1, comprising:
   obtaining said copolymer in an acidic and optionally distilled form; and
   partially or totally neutralizing said copolymer by at least one neutralization agent having a monovalent or polyvalent cation.

10. The method according to claim 1, comprising obtaining said copolymer by:
    radical polymerization in a solution, in a direct or inverse emulsion, in a suspension or precipitation in solvent, in the presence of catalytic systems and transfer agents;
    controlled radical polymerization;
    atom transfer radical polymerization; or
    controlled radical polymerization by at least one sulfurated derivative selected from the group consisting of carbamates, dithioesters, trithiocarbonates, and xanthates.

11. The method according to claim 1, comprising treating and separating said copolymer, before or after the total or partial neutralization reaction, into several phases, using static or dynamic processes, by at least one polar solvent.

12. The method according to claim 1, wherein said at least one mineral material is selected from the group consisting of: natural or synthetic calcium carbonate, dolomites, limestone, kaolin, talc, gypsum, lime, magnesium, titanium dioxide, satin white, barium sulfate, aluminum trioxide or aluminum trihydroxide, silicas, mica; mixtures of calcium carbonate with aluminum trihydroxide or aluminum trioxide; mixtures with synthetic or natural fibers; mineral co-structures; and mixtures thereof.

13. The method according to claim 1, wherein said mineral material is calcium carbonate and said at least one of aqueous suspension and/or aqueous dispersion of at least one mineral has a calcium ion content in the aqueous phase of less than 30 ppm.

14. The method according to claim 1, wherein said at least one of aqueous suspension and/or aqueous dispersion of at least one mineral material comprises 0.05% to 5% by dry weight of said copolymer, relative to the dry weight of mineral material.

15. The method for manufacturing a sheet of paper from pulp according to claim 1, wherein the paper pulp's pH is less than 9.

16. The method according to claim 15, comprising adjusting the pH of the paper pulp by means of a weak acid.

17. The method according to claim 1, wherein said q represents an interger at least equal to 1 wherein $15 \leqq (m+n+p) q \leqq 120$.

18. The method according to claim 1, wherein said R represents a radical selected from the group consisting of: vinyl; acrylic, methacrylic, maleic, itaconic, crotonic, vinylphthalic esters; unsaturated urethanes; allylic ethers substituted or not substituted or vinyl ethers substituted or not substituted; ethylenically unsaturated amides or imides; and acrylamide and methacrylamide.

19. The method according to claim 18, wherein said unsaturated urethane is selected from the group consisting of acrylurethane, methacrylurethane, $\alpha$-$\alpha'$ dimethyl-isopropenyl-benzylurethane and allylurethane.

* * * * *